(12) United States Patent
Moon et al.

(10) Patent No.: US 7,018,564 B2
(45) Date of Patent: Mar. 28, 2006

(54) METHOD FOR MAKING PHOSPHOR INK AND SYSTEM USING THE SAME

(75) Inventors: Won-Seok Moon, Seoul (KR); Bum-Jin Bae, Seoul (KR); Na-Mi Byun, Seoul (KR); Jin-Mok Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 10 days.

(21) Appl. No.: 10/752,499

(22) Filed: Jan. 8, 2004

(65) Prior Publication Data

US 2005/0017217 A1 Jan. 27, 2005

(30) Foreign Application Priority Data

Jul. 21, 2003 (KR) .................. 10-2003-0049856

(51) Int. Cl.
*B01F 11/02* (2006.01)

(52) U.S. Cl. .................. 252/301.36; 106/31.64; 366/108; 366/110; 366/111; 366/112; 366/113; 366/114; 366/115; 366/116; 252/301.4 R; 252/301.4 F; 252/301.4 P; 252/301.4 S; 252/301.4 H; 252/301.5; 252/301.6 R; 252/301.6 F; 252/301.6 S; 252/301.6 P

(58) Field of Classification Search ............. 106/31.64; 252/301.36, 301.4 R, 301.4 F, 301.4 P, 301.4 S, 252/301.4 H, 301.5, 301.6 R–301.6 F; 366/108, 366/110–116

See application file for complete search history.

(56) References Cited

U.S. PATENT DOCUMENTS

| 4,275,333 A | * | 6/1981 | Kagami et al. ............. 313/495 |
| 5,698,614 A | | 12/1997 | Ueda et al. .................. 523/161 |
| 6,458,294 B1 | | 10/2002 | Oshima et al. ........ 252/301.36 |

FOREIGN PATENT DOCUMENTS

| DE | 3339869 | * | 6/1985 |
| DE | 3737473 | * | 5/1989 |
| JP | 06-308298 | * | 11/1994 |

* cited by examiner

*Primary Examiner*—C. Melissa Koslow

(74) *Attorney, Agent, or Firm*—Fleshner & Kim, LLP

(57) ABSTRACT

A method for making phosphor ink is provided which uses ultrasonic vibrations to remove surface defect layers from phosphor particles and to quickly and uniformly disperse the phosphor particles throughout a slurry. Propagation of low frequency vibration through the slurry generates cavitation, causing distortion and then removal of the surface defect layer, and propagation of high frequency vibration through the slurry causes the particles to be dispersed quickly and uniformly throughout the slurry. In this manner, a quantity of light generated in the phosphor and corresponding luminance of a PDP is increased.

26 Claims, 4 Drawing Sheets

METHOD FOR MAKING PHOSPHOR INK AND SYSTEM USING THE SAME

BACKGROUND OF THE INVENTION

1. Field of the Invention

The present invention relates to phosphor ink, and in particular to a method for making phosphor ink and a system using the same.

2. Description of the Related Art

In general, a printing technique using an ink jet system implements an expected image by discharging ink through nozzles, and accordingly unnecessary consumption of materials can be reduced. In addition, the printing technique can implement an image having high resolution by adjusting intervals of the nozzles, and accordingly applying it to display panels for various displays has been examined. In particular, applying it to a phosphor spreading method for a PDP (plasma display panel) has been examined.

In the PDP, because an inorganic phosphor having an average particle's diameter of 1 μm~10 μm is used as a luminous body, it is very important to use a technique for making phosphor ink in which the inorganic particles are uniformly dispersed.

Hereinafter, a method for making phosphor ink in accordance with the conventional art will be described with reference to FIG. 1.

FIG. 1 shows a method for making phosphor ink in accordance with the conventional art.

As depicted in FIG. 1, in the conventional method for making phosphor ink, by rubbing mechanically or colliding physically inorganic phosphor 11 (inorganic phosphor particles) mixed in a specific mixed liquor 10 against a ball 12 of a ball mill (not shown) or a dispersing agent 13 or a binder 14, etc., the inorganic phosphor 11 is dispersed in the mixed liquor 10, and accordingly phosphor ink can be obtained. Herein, by the ball 12 of the ball mill used in the conventional phosphor ink making method, because a size of each particle of the inorganic phosphor 11 can be reduced, the inorganic phosphor 11 can be passed a nozzle easily, and accordingly spray characteristics of the inorganic phosphor ink can be improved.

However, in the conventional method for making phosphor ink, when the inorganic phosphor 11 is dispersed in the mixed liquor 10, by friction between the particle with the ball of the ball mill or among the particles, a surface defect layer 20 is induced on the surfaces of particles of the inorganic phosphor 11. The surface defect layer 20 formed on the particle surface of the inorganic phosphor 11 will be described with reference to FIG. 2.

FIG. 2 illustrates the surface defect layer formed on the particle of the inorganic phosphor in accordance with the conventional art.

As depicted in FIG. 2, the surface defect layer 20 formed on the inorganic phosphor 11 reduces light generated in the phosphor, and accordingly radiating efficiency of a PDP using the phosphor is remarkably lowered. After a time for dispersing the inorganic phosphor 11 in the mixed liquor 10 has passed, a quantity of light generated in the phosphor is remarkably reduced. Hereinafter, radiating efficiency reduction of the phosphor caused by the surface defect layer 20 formed on the particle surface of the phosphor and a luminance lowering phenomenon caused by that will be described with reference to FIG. 3.

FIG. 3 is a graph illustrating the luminance lowering phenomenon caused by the surface defect layer formed on the particle surface of the phosphor.

As depicted in FIG. 3, the more a time for dispersing the inorganic phosphor particles in the mixed liquor 11 has passed, a size of an inorganic phosphor particle 11 gets smaller, because of that, spray characteristics can be improved. However, because the surface defect layer 20 formed on the particle surface of the phosphor 11 is increased, a quantity of light generated in the inorganic phosphor is reduced due to the surface defect layer 20, and accordingly luminance of the PDP is lowered. In more detail, when phosphor ink is made of inorganic phosphor particles having surface defect layers and a phosphor layer of a PDP is fabricated with that phosphor ink, luminance of the PDP is lowered due to the surface defect layers 20.

As described-above, in the method for making phosphor ink in accordance with the conventional art, a surface defect layer may be formed on the particle surface of the phosphor, a quantity of light generated in the phosphor may be reduced due to the surface defect layer, and accordingly luminance of a PDP may be lowered.

As described-above, in the method for fabricating phosphor ink in accordance with the conventional art, because a surface defect layer may be formed on the particle surface of the phosphor, a quantity of light generated in the phosphor may be reduced due to the surface defect layer, and accordingly luminance of a PDP may be lowered.

In the meantime, other phosphor inks according to the conventional art were disclosed in detail in U.S. Pat. No. 6,458,294 and U.S. Pat. No. 5,698,614.

SUMMARY OF THE INVENTION

In order to solve the above-mentioned problems, it is an object of the present invention to provide a method for making phosphor ink and a system using the same capable of increasing a quantity of light generated in the phosphor and increasing luminance of a PDP (plasma display panel) by removing a surface defect layer formed on a particle surface of the phosphor in making of phosphor ink.

It is another object of the present invention to provide a method for making phosphor ink and a system using the same capable of dispersing phosphor particles in a slurry quickly and uniformly in making of phosphor ink.

In order to achieve the above-mentioned objects, a method for making phosphor ink includes dispersing phosphor particles mixed in a slurry by generating ultrasonic vibrations.

In order to achieve the above-mentioned objects, a method for making phosphor ink includes dispersing phosphor particles mixed in a slurry by generating ultrasonic vibrations in a high frequency band; and removing surface defect layers formed on the phosphor particles by generating ultrasonic vibrations in a low frequency band.

In order to achieve the above-mentioned objects, a method for making phosphor ink includes obtaining a slurry for phosphor ink by putting a phosphor material and a dispersing agent in a first reaction container in which a solvent is contained and stirring it; obtaining a mixed liquor for phosphor ink by putting a binder into a second reaction container in which the solvent is contained; and putting the mixed liquor and the slurry into a dispersing container in which a piezoelectric element is installed and applying first ultrasonic vibrations and second ultrasonic vibrations to the dispersing container alternately and periodically through the piezoelectric element.

In order to achieve the above-mentioned objects, a system for making phosphor ink in accordance with the present invention includes a control unit for generating an electric signal; a piezoelectric element for generating ultrasonic vibrations by an electric signal generated by the control unit; and a dispersing container for containing a slurry in which phosphor particles are mixed; wherein the piezoelectric element is installed at the dispersing container.

In order to achieve the above-mentioned objects, the piezoelectric element of the system generates ultrasonic vibrations within several tens Hz~several hundreds Hz and ultrasonic vibrations within several hundreds Hz~several thousands KHz alternately and periodically according to an electric signal outputted from the control unit.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Hereinafter, a method for making phosphor ink and a system using the same capable of dispersing phosphor particles quickly and uniformly, increasing a quantity of light generated in the phosphor by removing the surface defect layers and increasing luminance of a PDP (plasma display panel) by repeatedly performing a process for dispersing phosphor particles mixed in a slurry with ultrasonic vibrations in a high frequency band and a process for removing surface defect layers formed on the surfaces of the phosphor particles with ultrasonic vibrations in a low frequency band will be described with reference to FIGS. 4~5B.

Figure 1:
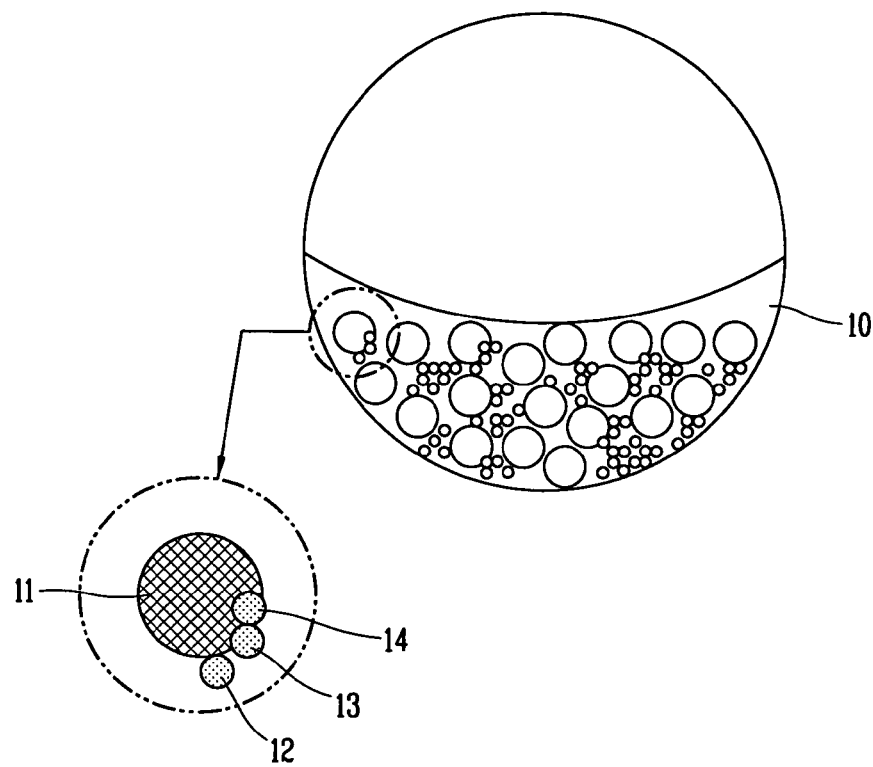
FIG. 1 shows a method for making phosphor ink in accordance with the conventional art.
Figure 2:
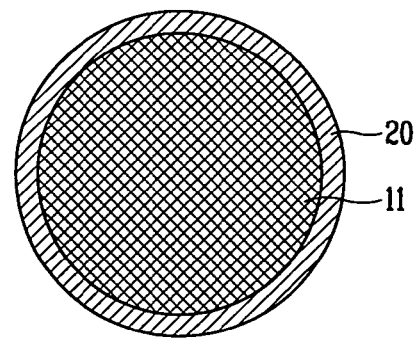
FIG. 2 shows a surface defect layer formed on the surface of an inorganic phosphor particle in accordance with the conventional art.
Figure 3:
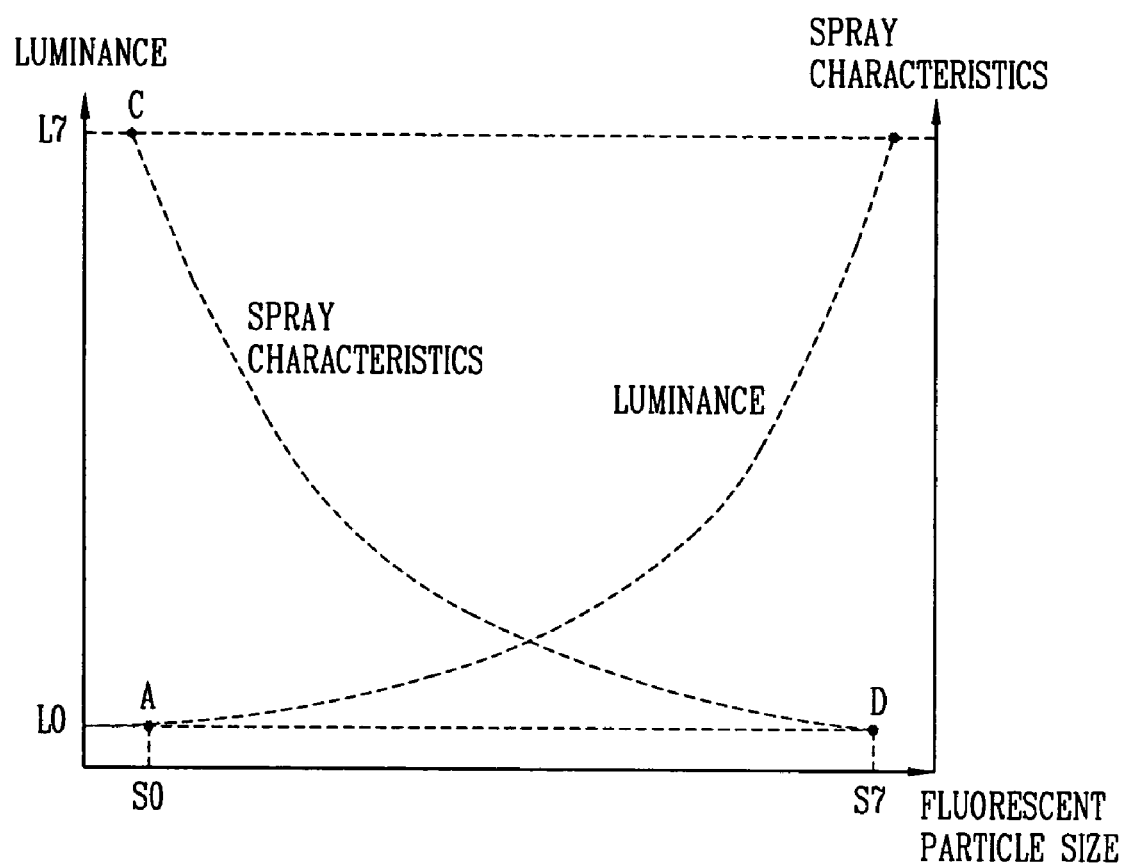
FIG. 3 is a graph showing a luminance lowering phenomenon due to a surface defect layer formed on the surface of a phosphor particle.
Figure 4:
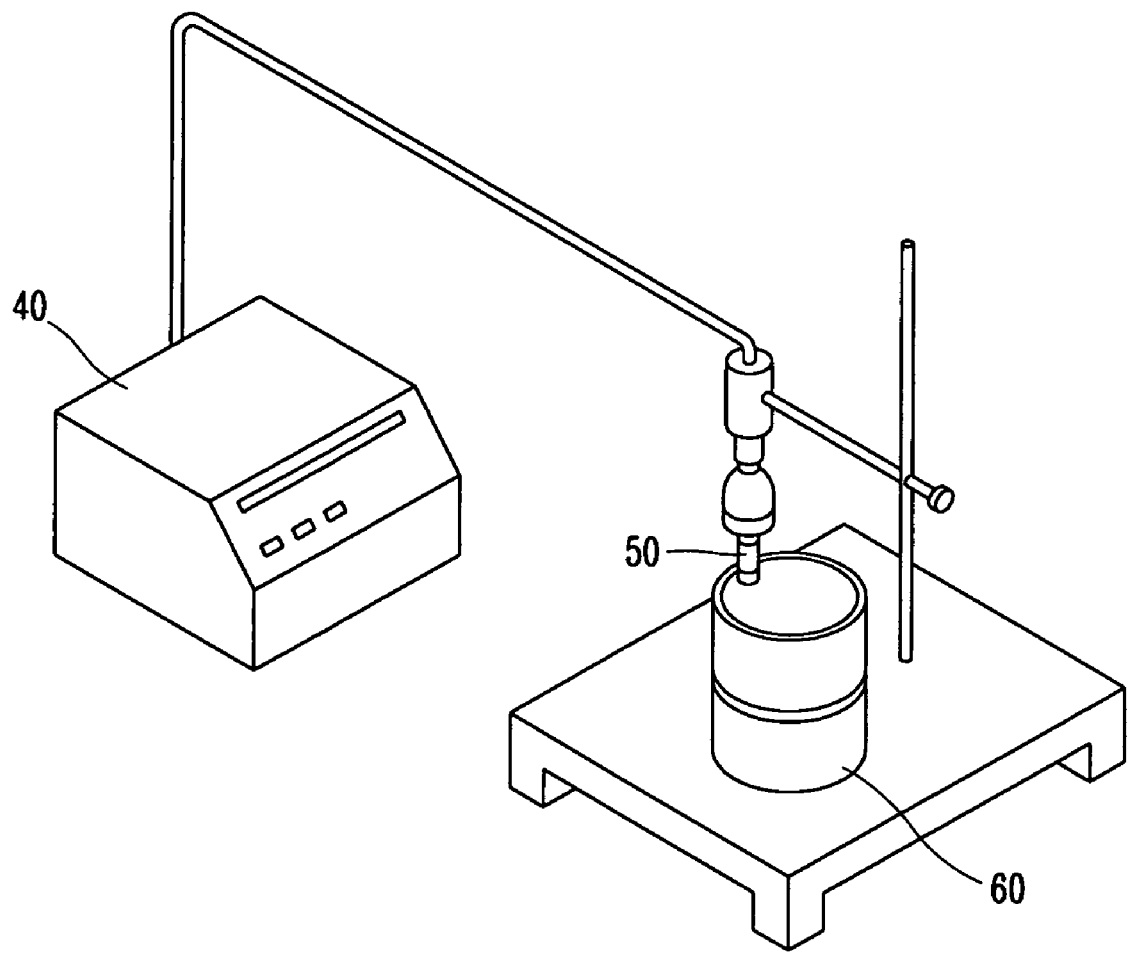
FIG. 4 shows a system using a method for making phosphor ink in accordance with the present invention.

FIG. 4 shows a system using a method for making phosphor ink in accordance with the present invention.

As depicted in FIG. 4, the system using the method for making phosphor ink in accordance with the present invention includes a control unit 40 for generating an electric signal having a high frequency signal or an electric signal having a low frequency signal; a piezoelectric element 50 for generating ultrasonic vibrations in a high frequency band or ultrasonic vibrations in a low frequency band by the electric signal having a high frequency signal or the electric signal having a low frequency signal; and a dispersing container 60 for containing a slurry in which phosphor particles are mixed. Herein, the piezoelectric element is installed at the dispersing container, and surface defect layers 20 formed on the phosphor particles in the slurry in the dispersing container 60 are removed by ultrasonic vibrations in a low frequency band generated by the piezoelectric element 50. In addition, the phosphor particles mixed in the slurry are dispersed quickly and uniformly by ultrasonic vibrations in a high frequency band generated by the piezoelectric element 50.

Hereinafter, the operation of the system using the method for making phosphor ink in accordance with the present invention will be described.

First, the control unit 40 applies a voltage signal having the high frequency signal or a voltage signal having the low frequency signal to the piezoelectric element 50.

The piezoelectric element 50 generates ultrasonic vibrations in a high frequency band by the voltage signal having the high frequency signal and generates ultrasonic vibrations in a low frequency band by the voltage signal having the low frequency signal. The piezoelectric element 50 can be installed at the internal wall or the bottom of the dispersing container 60. The piezoelectric element 50 generates ultrasonic vibrations in a low frequency band within several tens Hz~several hundreds Hz and ultrasonic vibrations in a high frequency band within several hundreds Hz~several thousands KHz. The ultrasonic vibrations disperse the phosphor particles mixed in the slurry quickly and uniformly. Herein, plural piezoelectric elements 50 can be installed at the dispersing container 60. In addition, a piezoelectric element 50 for generating ultrasonic vibrations in a low frequency band and a piezoelectric element 50 for generating ultrasonic vibrations in a high frequency band can be respectively installed at the dispersing container 60.

For example, cavitation occurs by the ultrasonic vibrations in the low frequency band generated by the piezoelectric element 50, and the surface defect layers formed on the phosphor particles in the slurry are removed by the cavitation. In addition, vibration acceleration is increased by the ultrasonic vibrations in the high frequency band generated by the piezoelectric element 50, and the ultrasonic particles mixed in the slurry are dispersed quickly and uniformly by the increased vibration acceleration. It will be described in detail with reference to FIGS. 5A and 5B.

Figure 5A:
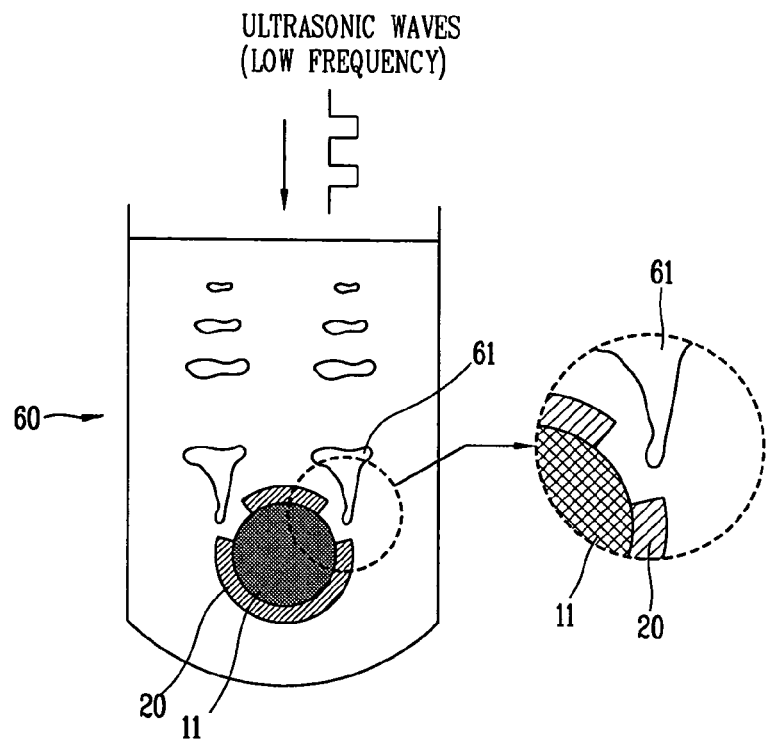
FIG. 5A shows a process for removing surface defect layers formed on phosphor particles in a slurry by generating ultrasonic vibrations in a low frequency band (several tens Hz~several hundreds Hz)

FIG. 5A shows a process for removing surface defect layers formed on phosphor particles in a slurry by generating ultrasonic vibrations in the low frequency band (several tens Hz~several hundreds Hz).

As depicted in FIG. 5A, when ultrasonic vibrations in the low frequency band of several tens Hz~several hundreds Hz are generated through the piezoelectric element 50, the generated ultrasonic vibrations are propagated to a liquid (for example, a liquid in which the mixed liquor is mixed with the slurry or the slurry) in the dispersing container 60, a pressure increasing portion and a pressure decreasing portion partially occur, according to that, cavitation 61 occurs in a negative pressure (dilatability) cycle, the surface defect layer is distorted and broken in a positive pressure (compression force) cycle, at that time, an impulsive force is generated, and the surface defect layer 20 formed on the particle of the phosphor inside the slurry is removed by the impulsive force.

Figure 5B:
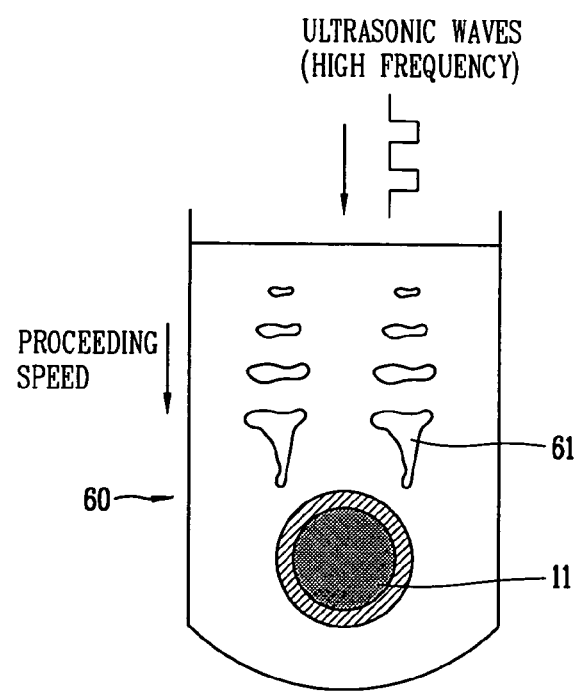
FIG. 5B shows a process for dispersing phosphor particles in a slurry quickly and uniformly by generating ultrasonic vibrations in a high frequency band (several hundreds Hz~several thousands KHz).

FIG. 5B shows a process for dispersing phosphor particles in a slurry quickly and uniformly by generating ultrasonic vibrations in the high frequency band (several hundreds Hz~several thousands KHz).

As depicted in FIG. 5B, when ultrasonic vibrations in the high frequency band of several hundreds Hz~several thousands KHz are generated through the piezoelectric element 50, the generated ultrasonic vibrations in the high frequency band have the amplitude greater than that of ultrasonic vibrations in the low frequency band, a proceeding speed is faster with the passage of time, and accordingly vibration acceleration is increased. By the vibration acceleration, because the phosphor particles mixed in the slurry 11 can be dispersed quickly, a time for dispersing the phosphor particles can be reduced, and the phosphor particles can be dispersed more uniformly in comparison with the conventional art.

In addition, by alternately repeating ultrasonic vibrations in the high frequency band and ultrasonic vibrations in the low frequency band periodically, while the phosphor particles are dispersed by the ultrasonic vibrations in the high frequency band, the surface defect layers formed on the phosphor particles are removed once more by the ultrasonic vibrations in the low frequency band. In more detail, it is preferable to repeat the dispersing process and the surface defect layer removing process alternately and periodically.

Accordingly, in the present invention, by repeating the process for dispersing phosphor particles mixed in the slurry with ultrasonic vibrations in the high frequency band and the process for removing the surface defect layers formed on the phosphor particles with ultrasonic vibrations in the low frequency band periodically, the phosphor particles can be dispersed quickly and uniformly, and the surface defect layers formed in the dispersing process can be removed.

Hereinafter, making phosphor ink used for a phosphor layer of a PDP by the phosphor ink making method in accordance with the present invention will be described.

First, a phosphor material selected from a group consisting of phosphor materials for a PDP such $Zn_2SiO_4:Mn^{2+}$, $(Y,Gd)BO_3:Eu^{3+}$, and $BaMgAl_{10}O_{17}:Eu^{3+}$, at least one kind of organic solvents selected from distilled water, ketones, glycols, and alcohols, and a dispersing agent are put into a first reaction container, it is stirred, and accordingly a slurry is obtained.

It is preferable to use a solvent having a boiling point within 90° C.~200° C. It is more preferable to use a solvent having a boiling point within 90° C.~180° C. In more detail, when a boiling point of the solvent is lower than 90° C., drying is proceeded quickly around a nozzle for spraying the phosphor ink before the phosphor ink is sprayed, and accordingly inferior ink can be made. On the other hand, when a boiling point of the solvent is higher than 200° C., drying characteristics of a phosphor layer made of the phosphor material can be deteriorated.

In the meantime, by separating from the step for obtaining the slurry by stirring the phosphor material and the dispersing agent, a mixed liquor is obtained by putting one material selected from PVA (polyvinyl-acetate), acryls, and celluloses and at least one kind of solvents selected from distilled water, ketones, glycols, and alcohols into a second reaction container and stirring it.

Afterward, the mixed liquor and the slurry are put into the dispersing container in which the piezoelectric element 50 is installed at the internal wall or the bottom, ultrasonic vibrations in the low frequency band within several tens Hz~several hundreds Hz and ultrasonic vibrations in the high frequency band within several hundreds Hz~several thousands KHz are alternately and periodically generated through the piezoelectric element 50, and the generated ultrasonic vibrations are propagated to the dispersing container 60.

The ultrasonic vibrations disperse the phosphor particles mixed in the slurry in the mixed liquor quickly and uniformly. Herein, by the ultrasonic vibrations of several tens Hz~several hundreds Hz, cavitation occurs, and the surface defect layers formed on the phosphor particles in the slurry are removed by the cavitation. In addition, by the ultrasonic vibrations of several hundreds Hz~several thousands KHz, vibration acceleration is increased, by the increased vibration acceleration, the phosphor particles mixed in the slurry are dispersed in the mixed liquor quickly and uniformly.

Accordingly, it is possible to disperse the phosphor particles in the slurry in the mixed liquor quickly and uniformly and obtain the phosphor ink without having surface defect layers.

In the meantime, the method for making phosphor in accordance with the present invention can be applied to the process for forming the slurry by stirring the phosphor material and the dispersing agent, and it can be applied again to the process for making the phosphor ink by putting the mixed liquor and the slurry in the dispersing container.

As described-above, in the method for making phosphor in accordance with the present invention, by repeatedly performing the dispersing operation for dispersing the phosphor particles mixed in the slurry with ultrasonic vibrations in the high frequency band and the surface defect layer removing operation for removing the surface defect layers formed in the slurry with ultrasonic vibrations in the low frequency band, the phosphor particles can be dispersed quickly and uniformly, and the surface defect layers formed on the phosphor particles in the dispersing operation can be removed. In more detail, by dispersing the phosphor particles in the mixed liquor quickly and uniformly and removing the surface defect layers formed on the phosphor particles in the dispersing process, better phosphor ink can be made.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for making phosphor ink, comprising:
  dispersing phosphor particles mixed in a slurry by generating ultrasonic vibrations in a first frequency band and generating ultrasonic vibrations in a second frequency band, wherein the first and second frequency bands are different.

2. The method of claim 1, wherein the first frequency band is a high frequency band and in the second frequency band is a low frequency band, and wherein the dispersing step comprises generating ultrasonic vibrations in the high frequency band and the low frequency band alternately and repeatedly.

3. A method for making phosphor ink, comprising:
  dispersing phosphor particles mixed in a slurry by generating ultrasonic vibrations in a high frequency band; and
  removing surface defect layers formed on the phosphor particles by generating ultrasonic vibrations in a low frequency band.

4. The method of claim 3, wherein the dispersing step and the removing step are repeated alternately and periodically.

5. The method of claim 3, wherein the ultrasonic vibrations are generated by at least one piezoelectric element provided with a dispersing container, wherein the at least one piezoelectric element generates ultrasonic vibrations in a high frequency band by an electric signal having a high frequency signal and ultrasonic vibrations in a low frequency band by an electric signal having a low frequency signal.

6. The method of claim 3, wherein the phosphor particles dispersing step includes:

generating ultrasonic vibrations in a high frequency band through a piezoelectric element installed at a dispersing container in which the slurry is contained; and dispersing phosphor particles mixed in the slurry with the generated ultrasonic vibrations in the high frequency band.

7. The method of claim 6, wherein the high frequency band is within several hundreds Hz~several thousands KHz.

8. The method of claim 3, wherein the surface defect layer removing step includes the:

generating ultrasonic vibrations in a low frequency band through a piezoelectric element installed at a dispersing container in which the slurry is contained; and removing surface defect layers formed on the phosphor particles with the generated ultrasonic vibrations in the low frequency band.

9. The method of claim 8, wherein the low frequency band is within several tens Hz~several hundreds Hz.

10. The method of claim 3, further comprising:

obtaining a mixed liquor for phosphor ink by putting a binder into a reaction container in which a solvent is contained; and putting the mixed liquor and the slurry into the dispersing container in which the piezoelectric element is installed and generating ultrasonic vibrations in a low frequency band and ultrasonic vibrations in a high frequency alternately and periodically through the piezoelectric element.

11. A method for making phosphor ink, comprising:

obtaining a slurry for phosphor ink by puffing a phosphor material and a dispersing agent in a first reaction container in which a solvent is contained and stirring it;

obtaining a mixed liquor for phosphor ink by puffing a binder into a second reaction container in which the solvent is contained; and puffing the mixed liquor and the slurry into a dispersing container in which a piezoelectric element is installed and generating first ultrasonic vibrations and second ultrasonic vibrations alternately and periodically through the piezoelectric element.

12. The method of claim 11, wherein the first ultrasonic vibrations are ultrasonic vibrations in a low frequency band and are generated by the piezoelectric element installed at the dispersing container, and surface defect layers formed on particles of the phosphor are removed by the generated ultrasonic vibrations in the low frequency band.

13. The method of claim 12, wherein the low frequency band is within several tens Hz~several hundreds Hz.

14. The method of claim 11, wherein the second ultrasonic vibrations are ultrasonic vibrations in a high frequency band and are generated by the piezoelectric element installed in the dispersing container, and the phosphor particles mixed in the slurry are dispersed in the mixed liquor by the generated ultrasonic vibrations in the high frequency band.

15. The method of claim 14, wherein the high frequency band is within several hundreds Hz~several thousands KHz.

16. The method of claim 11, wherein the solvent is at least one kind of an organic solvent selected from distilled water, ketones, glycols, and alcohols.

17. The method of claim 11, wherein the phosphor material is one selected from a group consisting of $Zn_2SiO_4$:$Mn^{2+}$, $(Y,Gd)BO_3$:$Eu^{3+}$, and $BaMgAl_{10}O_{17}$:$Eu^{3+}$.

18. The method of claim 1, wherein the high frequency band is within several hundreds Hz and several thousands KHz.

19. The method of claim 1, wherein the low frequency band is within several tens Hz and several hundreds Hz.

20. The method of claim 1, wherein generating ultrasonic vibrations in a low frequency band results in removing surface defect layers formed on the phosphor particles.

21. The method of claim 20, wherein the ultrasonic vibrations in a low frequency band cause cavitation within a fluid in which the phosphor particles are mixed, the cavitation causing distortion in the surface defect layers and separation of the surface defect layers from the phosphor particles.

22. The method of claim 5, wherein the at least one piezoelectric element comprises a first piezoelectric element which generates ultrasonic vibrations in a high frequency band, and a second piezoelectric element which generates ultrasonic vibrations in a low frequency band.

23. The method of claim 5, wherein the at least one piezoelectric element is provided at an internal wall of the dispersing container.

24. The method of claim 5, wherein the at least one piezoelectric element is provided beneath the dispersing container.

25. The method of claim 8, wherein the ultrasonic vibrations in the low frequency band cause cavitition in the slurry, the cavitation causing distortion in the surface defect layers and separation of the surface defect layers from the phosphor particles.

26. The method of claim 12, wherein the ultrasonic vibrations in the low frequency band cause cavitition in the slurry, the cavitation causing distortion in the surface defect layers and separation of the surface defect layers from the phosphor particles.

* * * * *